(12) United States Patent
Chang

(10) Patent No.: US 7,602,621 B2
(45) Date of Patent: Oct. 13, 2009

(54) HALF BRIDGE CONVERTER

(75) Inventor: Yu-Yuan Chang, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 122 days.

(21) Appl. No.: 11/965,643

(22) Filed: Dec. 27, 2007

(65) Prior Publication Data

US 2009/0168466 A1    Jul. 2, 2009

(51) Int. Cl.
  *H02M 3/335*   (2006.01)
  *H02M 3/24*   (2006.01)
(52) U.S. Cl. .......................................... 363/17; 363/98
(58) Field of Classification Search .................... 363/89, 363/17, 98; 323/266, 222
  See application file for complete search history.

(56) References Cited

U.S. PATENT DOCUMENTS 4,533,986 A * 8/1985 Jones ........................... 363/17
6,650,552 B2 * 11/2003 Takagi et al. .................. 363/17
6,888,728 B2 * 5/2005 Takagi et al. .................. 363/17
7,218,081 B2 * 5/2007 Jang et al. .................... 323/266
7,375,994 B2 * 5/2008 Andreycak .................... 363/89

* cited by examiner

*Primary Examiner*—Shawn Riley
(74) *Attorney, Agent, or Firm*—Muncy, Geissler, Olds & Lowe, PLLC

(57) ABSTRACT

A half bridge converter having a pulse width control unit, a level regulating unit, a half bridge switch unit, an electricity converting unit and a feedback unit is disclosed. The level regulating unit receives a first DC electricity and boosting the first DC electricity to a working voltage level for forming a working electricity. The pulse width control unit produces a conduction cycle signal for controlling the half bridge switch unit to switch the working electricity to a conduction timing of the electricity converting unit, so that the electricity converting unit converts the working electricity to output a second DC electricity. The feedback unit draws a feedback signal from the second DC electricity to send to the level regulating unit for altering the voltage of the working electricity, so as to adjust the output of the electricity converting unit, thereby achieving voltage regulation.

5 Claims, 3 Drawing Sheets

HALF BRIDGE CONVERTER

FIELD OF THE INVENTION

The present invention is related to a half-bridge converter, and more particularly to a converter which can convert an input DC electricity into another output DC electricity.

BACKGROUND OF THE INVENTION

Since most electronic products need stable and non-noise DC electricity for providing power, the AC electricity provided by the electric power company must pass through a rectifier for converting the AC electricity into a first DC electricity. But, no mater utilizing half wave rectifier or full wave rectifier, the level of the converted first DC electricity still alters constantly just like the DC electricity, so that the electronic products can not utilize the unstable first DC electricity. Therefore, the converter becomes very important. Converters are used to convert the first DC electricity into a second DC electricity, which can have a fixed level for forming a stable output. Besides, the level of the second DC electricity also can be altered through setting the circuit of the converter. The architecture of the converter used currently is shown in FIG. 1. As shown, the converter includes a half bridge switch unit 21, an electricity converting unit 22, a PWM (Pulse Width Modulation) control unit 23 for producing a conduction cycle signal and a feedback unit 24 for producing a feedback signal. The half bridge switch unit 21 is connected to a DC power source 1 for obtaining a first DC electricity. The conduction cycle signal controls the half bridge switch unit 21 to conduct the duty cycle that the first DC electricity passes through the electricity converting unit 22. The electricity converting unit 22 converts the first DC electricity into a second DC electricity for outputting. The feedback unit 24 draws a feedback signal from the second DC electricity to send to the PWM control unit 23, so as to adjust the conduction cycle signal for altering the duty cycle of the half bridge switch unit 21, thereby achieving a feedback voltage regulation of the output of the converter which is modulated according to the load. In the above described architecture, if the half bridge switch unit is a half bridge switch circuit, for achieving the best working efficiency of the converter, the optimum condition is to let the half bridge switch circuit having a duty cycle ratio of 50:50, that is, the opening of the switch element in the half bridge switch circuit occupies 50% of the duty cycle. For preventing the output of the converter from alteration owing to the load, the output feedback can be modulated according to the alteration of the duty cycle ratio of the half bridge switch circuit. Therefore, since the converter can not maintain a 50:50 duty cycle ratio for providing the best efficiency all the time, the conversion efficacy will be lower than the optimum value. However, the reduction of efficacy namely represents the increment of loss, and the loss may become waste heat or may destroy the structure of electronic element so as to reduce the life time of the converter. Consequently, there is the need to provide an improvement.

SUMMARY OF THE INVENTION

The object of the present invention is to provide a circuit architecture of a half bridge converter for controlling the half bridge switch circuit to be stable, so that the half bridge switch circuit can have a better working efficiency, and also, the efficacy of output voltage regulation can be achieved.

The present invention is related to a half bridge converter having a pulse width control unit, a level regulating unit, a half bridge switch unit, an electricity converting unit and a feedback unit. The level regulating unit receives a first DC electricity and boosting the first DC electricity to a working voltage level for forming a working electricity. The pulse width control unit produces a conduction cycle signal for controlling the half bridge switch unit to conduct the working electricity to the cycle of the electricity converting unit, so that the electricity converting unit converts the working electricity to output a second DC electricity. The feedback unit draws a feedback signal from the second DC electricity to send to the level regulating unit for adjusting the working voltage level, so as to adjust the output of the electricity converting unit through altering the voltage of the working electricity, and thus, the second DC electricity does not alter owing to the load, thereby achieving voltage regulation. Besides, the feedback signal does not influence the duty cycle of the half bridge switch unit, so that the half bridge switch unit can be fixed at a duty cycle ratio with better efficiency.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DESCRIPTION OF THE PREFERRED EMBODIMENT

Figure 1:
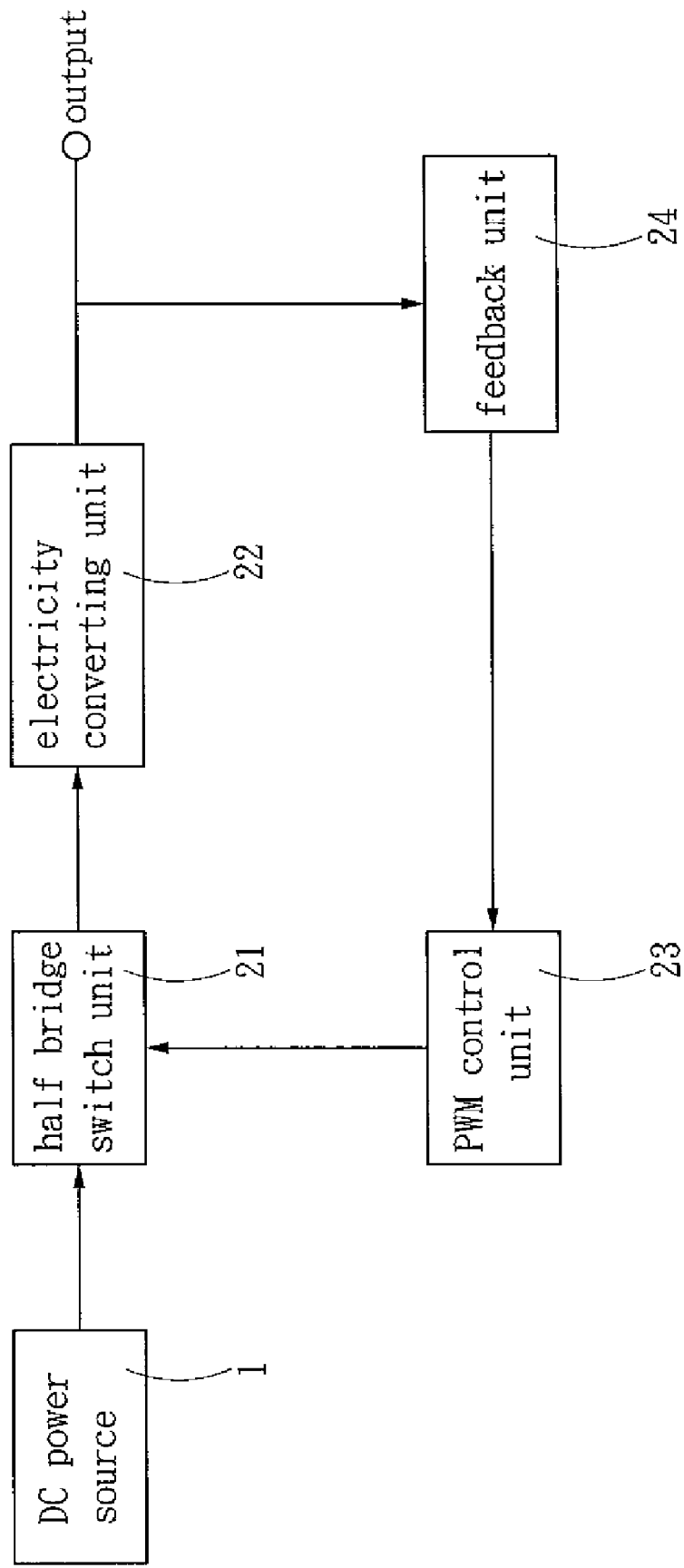
FIG. 1 is a circuit block diagram showing a conventional half bridge converter.
Figure 2:
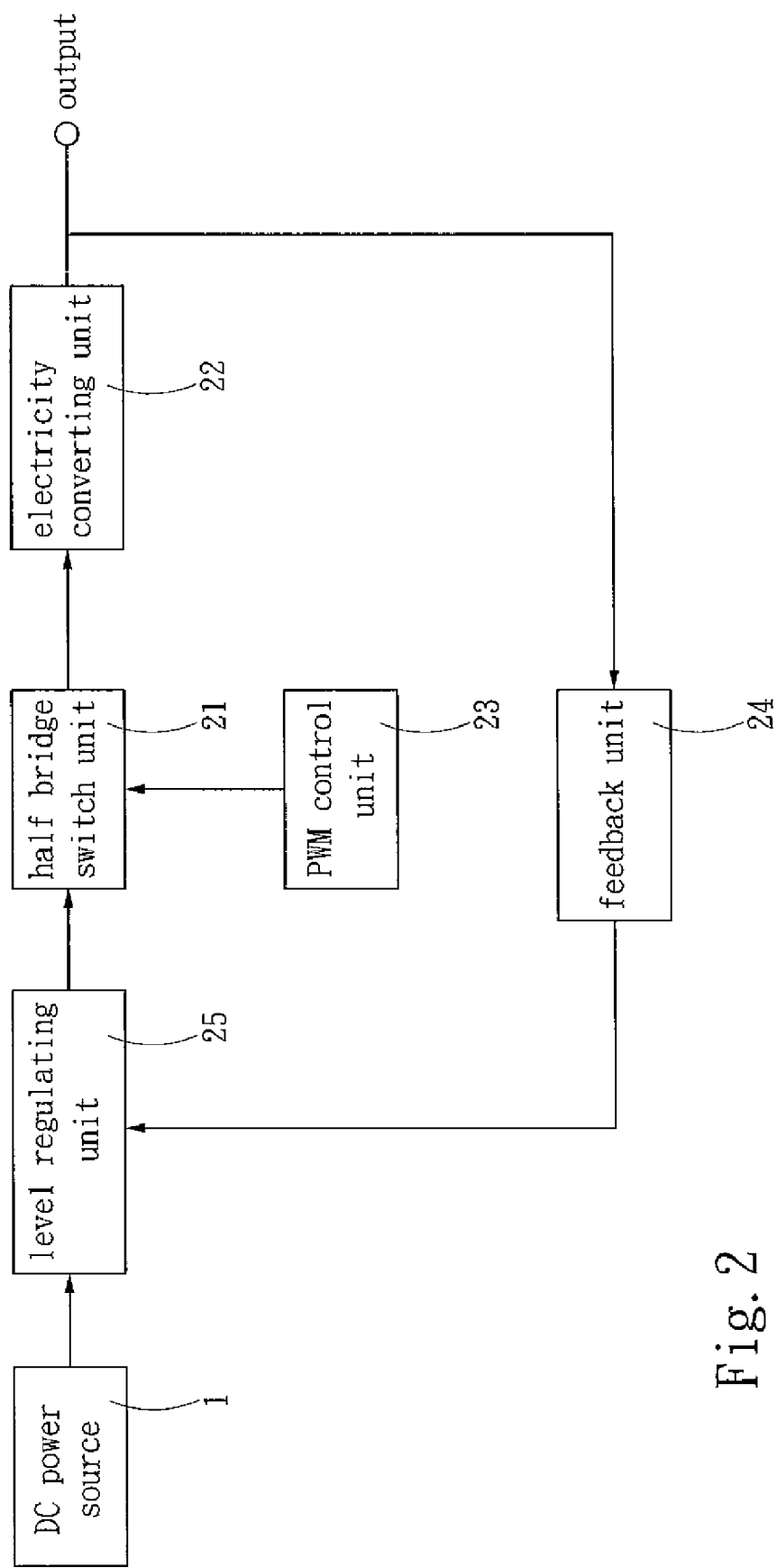
FIG. 2 is a block diagram shown a basic architecture of the present invention.

Please refer to FIG. 2 which shows the basic architecture of the present invention. The present invention is related to a half bridge converter, which includes a level regulating unit 25, a half bridge switch unit 21, an electricity converting unit 22, a pulse width control unit 23 and a feedback unit 24. The level regulating unit 25 receives a first DC electricity from a DC power source 1 and boosts the voltage of the first DC electricity to a preset working voltage level so as to form a working electricity. The pulse width control unit 23 produces a conduction cycle signal. The half bridge switch unit 21 is connected to the level regulating unit 25 for obtaining the working electricity and driven by the conduction cycle signal for switching the working electricity to a conduction timing of the electricity converting unit. The conduction cycle signal of the pulse width control unit 23 can be set to have a better duty cycle ratio, so that the half bridge switch unit 21 can have a better working efficiency. Furthermore, the feedback unit 24 draws a feedback signal from the second DC electricity, and the feedback signal is sent to the level regulating unit 25, so that the level regulating unit 25 can adjust the level of the working voltage according to the feedback signal, thereby adjusting the power of the second DC electricity through altering the working electricity. Through the architecture described above, the output of the converter can alter the voltage level of the working electricity inputted to the electricity converting unit 22 as the load alters, so that the electricity converting unit 22 can output higher power for satisfying load demand, so as to achieve output voltage regulation.

Figure 3:
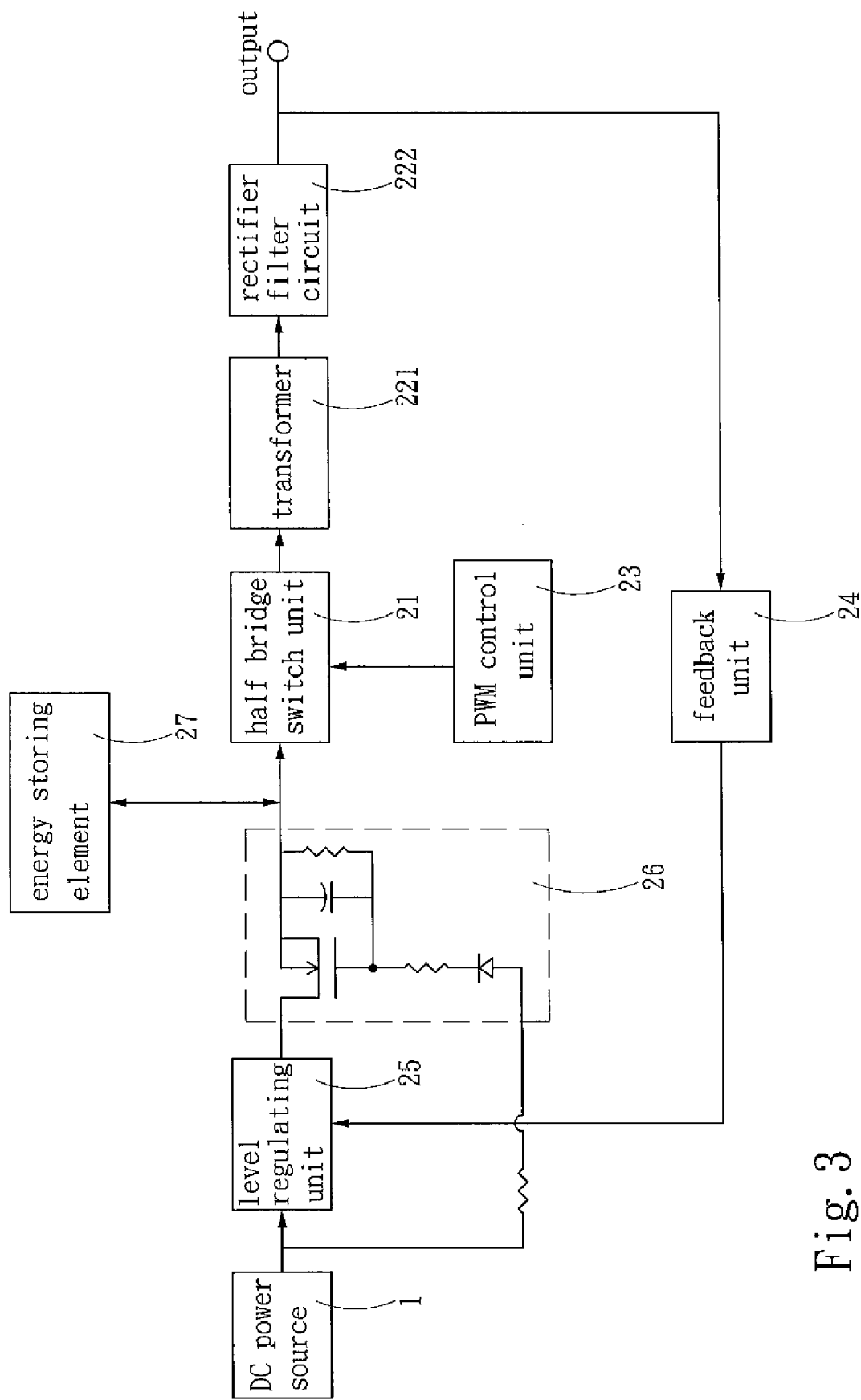
FIG. 3 is a block diagram showing a preferred embodiment of the present invention.

Please refer to FIG. 3, which is a block diagram showing the architecture of a preferred embodiment according to the present invention. The level regulating unit 25 can be a buck circuit and also can be a boost circuit or a buck-boost circuit. For avoiding the surge which might be generated as initiation, a voltage slope controlling unit 26 with variable impedance is mounted between the level regulating unit 25 and the half bridge switch unit 21, wherein the voltage slope controlling unit 26 can utilize a switch element with variable conductive impedance and a charging loop for obtaining the first DC electricity to charge, so as to form an initiating voltage to control the impedance of the switch element, thereby inhibiting the surge. Moreover, between the level regulating unit 25 and the half bridge switch unit 21, an energy storing element 27 can be mounted for maintaining the stability of the working electricity. The electricity converting unit 22 includes a transformer 221 and a rectifier filter circuit 222. The half bridge switch unit 21 can be driven by the conduction cycle signal to conduct the working electricity to the transformer 221, and the transformer 221 can transform the voltage according to the winding turns thereof. Besides, the primary side and the secondary side also can be isolated by the transformer 221 for avoiding a mutual power influence. The output of the transformer 221 passes through the rectifier filter circuit 222 to form the second DC electricity, so that when the load driven by the second DC electricity alters, the level regulating unit 25 can adjust the level of the working voltage according to the feedback signal obtained from the feedback unit 24, so as to change the power of the second DC electricity, and thus, achieve voltage regulation of the second DC electricity as the load alters.

In the embodiment described above, the converter can further include a power factor correction unit (not shown) for adjusting the current phase of the first DC electricity. Although the present invention is disclosed by the preferred embodiment described above, it is not limited, and one skilled in the art can make variation and modification without escaping the scope of the present invention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A half bridge converter for obtaining a first DC electricity from a DC power source and converting thereof into a second DC electricity through an electricity converting unit, comprising:

a level regulating unit, for receiving the first DC electricity and boosting the first DC electricity to a working voltage level for forming a working electricity;

a half bridge switch unit, connected to the level regulating unit for obtaining the working electricity and driven by a conduction cycle signal from a pulse width control unit to switch the working electricity to a conduction timing of the electricity converting unit, so that the electricity converting unit converts the working electricity to output the second DC electricity; and a feedback unit, for drawing a feedback signal from the second DC electricity to send to the level regulating unit, so that the level regulating unit adjusts the working voltage level according to the feedback signal, thereby adjusting the power of the second DC electricity through altering the working electricity.

2. The half bridge converter as claimed in claim 1, wherein between the level regulating unit and half bridge switch unit, an energy storing element is further included for maintaining the level of the working electricity.

3. The half bridge converter as claimed in claim 1, wherein the electricity converting unit comprises a transformer and a rectifier filter circuit.

4. The half bridge converter as claimed in claim 1, wherein between the level regulating unit and the half bridge switch unit, a voltage slope controlling unit with variable impedance is further included.

5. The half bridge converter as claimed in claim 4, wherein the voltage slop controlling unit utilizes a switch element with variable conductive impedance and a charging loop for obtaining the first DC electricity, so as to form an initiating voltage to control the impedance of the switch element.

\* \* \* \* \*